US006297607B1

(12) United States Patent
Becker

(10) Patent No.: US 6,297,607 B1
(45) Date of Patent: Oct. 2, 2001

(54) THERMAL COMPENSATION CONTROL FOR A MOTOR STARTER

(75) Inventor: James A. Becker, Grafton, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/505,940

(22) Filed: Feb. 15, 2000

Related U.S. Application Data

(60) Provisional application No. 60/124,220, filed on Mar. 12, 1999.

(51) Int. Cl.[7] .................................................... H02H 5/04

(52) U.S. Cl. ............................ 318/471; 318/473; 361/25

(58) Field of Search .................................... 318/471, 473, 318/798, 806; 310/68 R; 361/23, 24, 25, 27

(56) References Cited

U.S. PATENT DOCUMENTS 3,585,451 * 6/1971 Day, III ................................ 317/13
4,207,602 * 6/1980 Kussy et al. .......................... 361/26
4,434,390 * 2/1984 Elms .................................... 318/473
5,220,478 * 6/1993 Innes et al. .......................... 361/93
5,525,881 * 6/1996 Desrus ................................ 318/471
5,539,601 * 7/1996 Farag .................................... 361/23
5,998,893 * 12/1999 Fowler et al. ..................... 310/68 R
6,087,800 * 7/2000 Becker et al. ........................ 318/778
6,122,153 * 9/2000 Becker .................................. 361/25

* cited by examiner

*Primary Examiner*—Robert E. Nappi
*Assistant Examiner*—Rita Leykin
(74) *Attorney, Agent, or Firm*—Timothy J. Ziolkowski

(57) ABSTRACT

A motor starter thermal-compensation control is disclosed in which an ambient temperature sensor is positioned to sense ambient temperature and provide an ambient temperature signal in a motor starter. Additional temperature sensors are mounted in thermal communication with each bus bar in a motor starter and to monitor the temperature of each pole. A microprocessor is connected to each of the temperature sensors and periodically receives the temperature signals to monitor change in operating temperature of the motor starter. The control adjusts the output of the motor starter based on the change in the operating temperature so as to maintain a constant output as the ambient temperature increases, or the internal resistance of the device increases with temperature increase. In order to adjust the output, the system increases the FLA ampacity to compensate for the temperature increase. If the ampacity reaches the device's limits, the starter is prevented from engaging the motor with the power supply until it has sufficiently cooled down. The control calculates an estimated cool down time and displays the cool down time to prevent unnecessary start attempts during cool down.

18 Claims, 3 Drawing Sheets

THERMAL COMPENSATION CONTROL FOR A MOTOR STARTER

CROSS-REFERENCE TO RELATED APPLICATION

This application claims the benefit of prior U.S. Provisional Application Ser. No. 60/124,220 filed Mar. 12, 1999 and entitled THERMO COMPENSATION.

BACKGROUND OF THE INVENTION

The present invention relates generally to control systems for motor starters, and more particularly to a method and apparatus to compensate a motor starter for increases in temperature.

Many electrical devices use one form or another for thermal protection. One of the most common forms of temperature protection includes the use of thermistors, which are heat sensitive resistors that change resistive value with temperature change. Typically, the thermistor is connected to an electronic monitoring circuit which is set to react to a predetermined resistance value. When that resistance value is reached, the electronic monitoring circuit disconnects, or connects, the temperature protection circuits, which then turn the device off. Most electrical devices use a single thermistor for protection. Therefore, the level of protection provided is solely dependent on the location of that single thermistor. In other words, the thermal protection in reality protects only one small portion of the device. In larger devices, many components can be damaged before the thermal protection turns off the device. Another problem with such systems is that they provide little warning or assistance in diagnosing the cause of shutting down the device. Further, in some applications or processes, it is critical that the electrical device not be shutdown. In such processes, it would be desirable to have some indication of an overheating condition while keeping the process running.

Another common method of thermal protection is the use of a bimetallic element or disk mounted within the device to open or close a circuit. Such devices change shape with heat due to a differential thermal expansion between the two metals that form the physical configuration. As the device changes shape, it exerts a physical force on a switch, or on a set of contacts, to change the state of an electrical circuit. That is, a normally opened circuit, for example, will close to activate a temperature protection circuit when the bi-metal strip deforms to a deflection point that corresponds to a temperature indicating an overheating condition. This form of thermal protection requires calibration by hand-bending or tweaking for each particular device. Further, accuracy is suspect after field adjustments are made and such bi-metal devices typically require invasive connections between components, thereby reducing manufactureability, increasing the cost of the component, and increasing the overall size of the electrical equipment.

An electrical device with thermal compensation adjusts the starting characteristics of the controller to compensate for the additional ambient temperature. This compensation adjusts or increases the output of the device to compensate for the increasing internal resistance of the device caused by heating. Typically, such temperature compensation requires the use of mechanical components, such as the aforementioned bimetallic elements to sense the temperature and adjust the output accordingly. Since thermal compensation ranges are relatively small, several device configurations are required in order to cover an entire product line. Further, thermal compensation adds additional cost to the manufacturing of the device because of the additional components.

It would be desirable to have a thermal compensation and protection scheme that eliminates the need of these additional components to avoid the need for having variations of the product for different temperature ranges.

SUMMARY OF THE INVENTION

The present invention provides a motor starter thermal compensation and protection control that solves the aforementioned problems without adding significant cost to the overall system.

A motor starter thermal compensation and protection control, according to the present invention, includes an ambient temperature sensor to sense ambient temperature and provide an ambient temperature signal indicative of the ambient temperature of a motor starter, and at least one pole temperature sensor in thermal communication with an electrically conducting bus in the motor starter that produces a pole temperature signal indicative of a temperature of the electrically conducting bus. A processing unit is connected to the ambient temperature sensor and the at least one pole temperature sensor and is programmed to periodically acquire the ambient and pole temperature signals to determine an operating temperature of the motor starter, and monitor any changes in the operating temperature of the motor based on the periodic acquisitions of the ambient and pole temperature signals. The output of the motor starter is then adjusted based on the change in operating temperature so that the output of the electrical device is constant as the operating temperatures increase. This avoids the need of the electrical rating on the device to be sized larger than is required to compensate for the additional ambient heat in order to operate at the rated load.

In accordance with another aspect of the invention, a motor starter control for thermally protecting a motor and a motor starter includes an ambient temperature sensor for sensing ambient temperature and creating ambient temperature signals, and a pole temperature sensor for sensing a pole temperature in the motor starter and creating pole temperature signals therefrom. A memory is provided for periodically storing ambient and pole temperature signals, and a processor is used for comparing current ambient and pole temperature signals to previous ambient and pole temperature signals stored in memory. The processor is also used for increasing an FLA adjustment to the motor when current ambient and pole temperature conditions cause a previous FLA adjustment to be inadequate to start the motor due to increases in internal resistance.

In accordance with yet another aspect of the invention, a method of thermally protecting a motor and motor starter includes the steps of periodically monitoring an ambient temperature and a pole temperature of each pole in a motor starter and recording the periodically monitored ambient and pole temperatures. The process next includes comparing present ambient and pole temperatures to previously recorded ambient and pole temperatures and preventing a motor from starting if the temperature comparison reaches a maximum parameter and an FLA adjustment is at a motor limit.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
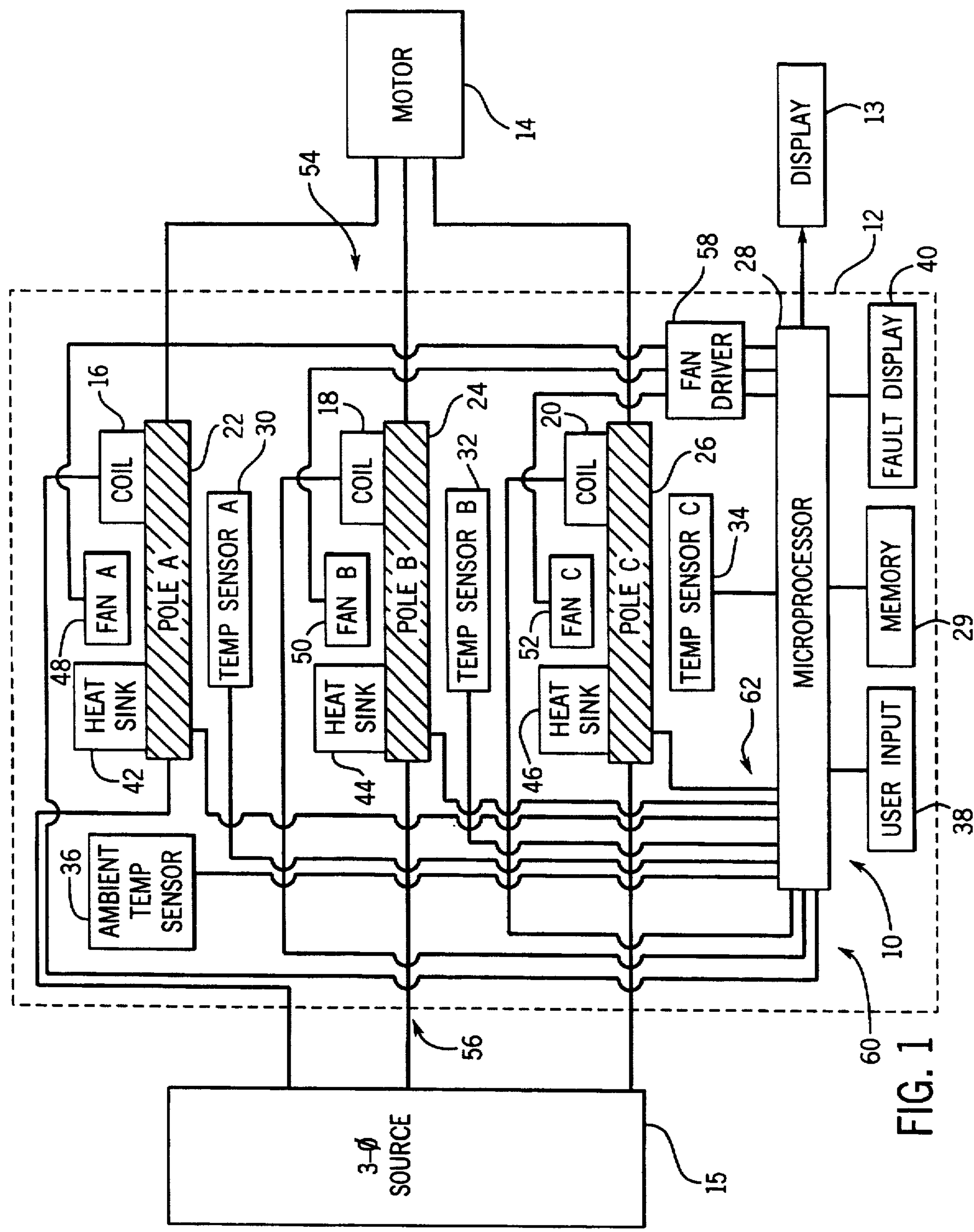
FIG. 1 is a block diagram of a motor connected to a three-phase source through a motor starter incorporating the present invention.

FIG. 1 is a block diagram of a motor starter thermal protection and compensation control 10 according to the present invention incorporated into a motor starter 12 controlling a motor 14 connected to a power source 15. Control 10 includes a central processing unit 28, such as a microprocessor, a microcontroller, a PLC, or any other device for electrical signal processing. The motor starter thermal protection control 10 controls the function of the motor starter 12 based on the operating temperatures of the device 12, the ambient, and the motor 14, together with look-up tables stored in memory 29.

As shown in FIG. 1, the control 10 of the present invention is shown in a three-phase motor starter application. In a manner that is known, the motor starter 12 relays power from a three-phase source 15 to the motor 14, in part by controlling coils 16, 18, and 20, and in part by controlling a pair of SCRs (not shown) that are typically clamped between two conducting bus bars, which is shown in block diagram form as pole A 22, pole B 24, and pole C 26.

The microprocessor 28 of the motor starter thermal protection control 10 receives input signals from a number of temperature sensors. In a preferred embodiment, a temperature sensor 30, 32, 34 is located on each power pole A, B, C. That is, temperature sensor 30 is in thermal communication with power pole 22, temperature sensor 32 is in thermal communication with power pole 24, and temperature sensor 34 is in thermal communication with power pole 26. An ambient temperature sensor 36 is also located within the motor starter 12 and connected to the microprocessor 28. In a preferred embodiment, the ambient temperature sensor 36 is located in a cover assembly between poles A and B or between poles B and C to sense the ambient temperature across the poles and within the housing enclosing motor starter 12.

The microprocessor 28 is also capable of receiving at least one input 38, such as a dip-switch, that can override a temperature protection control to prevent the motor from shutting down when a fault is detected. The control can indicate and display the fault on fault display 40. The override feature is typically only used in critical processes where the motor can be sacrificed in order to keep the process functioning.

The motor starter 12 also includes heat sinks 42, 44, and 46 mounted to each power pole, 22, 24, and 26, respectively. Each power pole 22, 24, and 26 also has an associated fan 48, 50 and 52, respectively, to draw air into the load side 54 of the motor starter 12, move the air across each heat sink 42, 44 and 46, and discharge the air out a line side 56 of the motor starter 12. The microprocessor 28 is connected to a fan driver 58, which in turn drives the fans 48, 50 and 52. The microprocessor 28 also has output control lines 60 for controlling the coils 16, 18, and 20 as well as output control line 62 connected to control the SCRs of each pole 22, 24 and 26.

The motor starter 12 is also connectable to a display device 13 with external connection so that the display 13 can be mounted to the motor starter 12 or remotely. Internally, the display device 13 is connected to the processor 28 and is used to display a time to a next motor start after the thermal protection control has been activated, as will be further described with reference to FIG. 2. Where the fault display 40 is typically simply a warning light, the display device 13 shows a calculated time until the next start will be allowed, preferably as a digital read-out.

Figure 2:
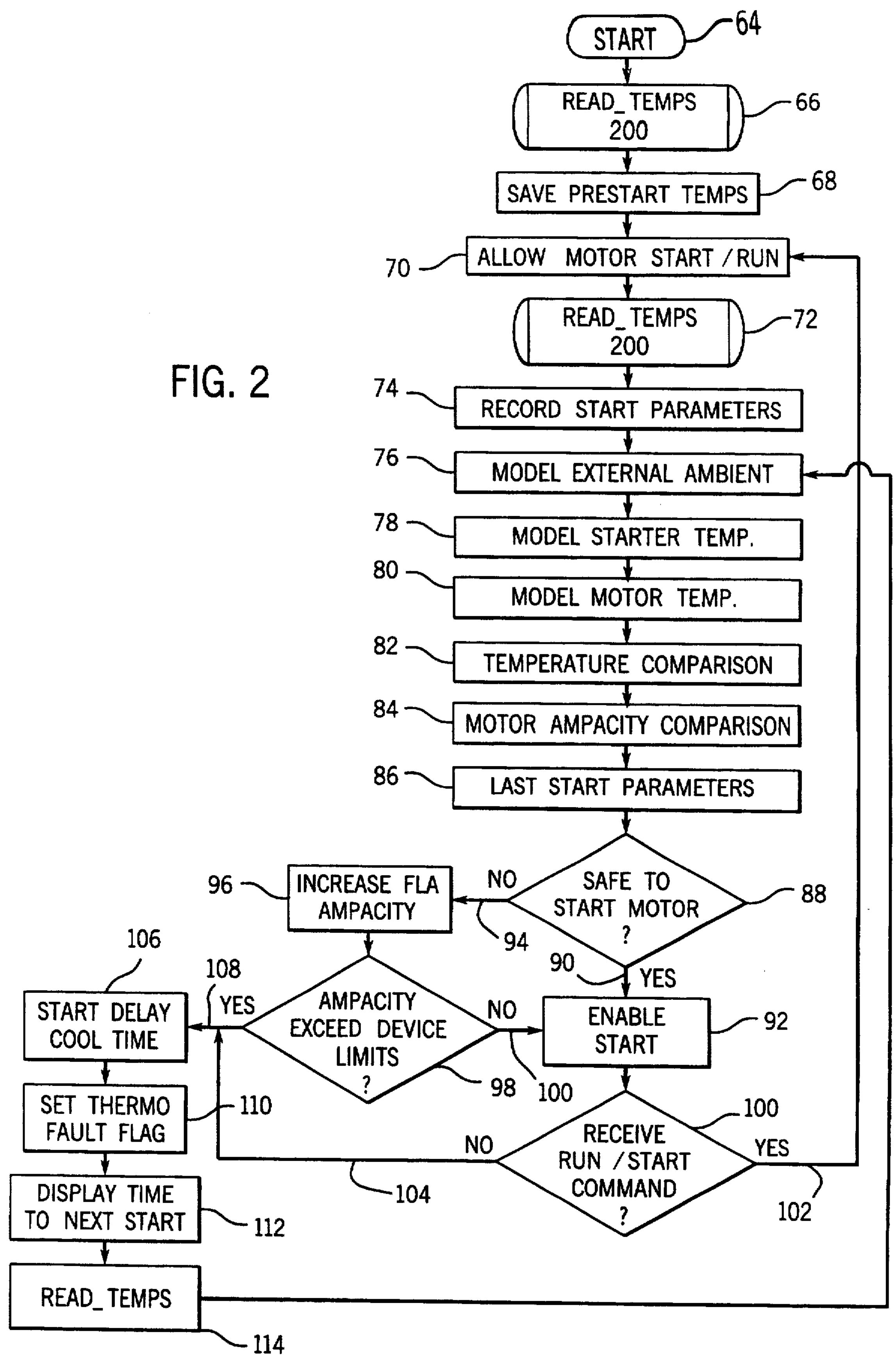
FIG. 2 is a flow chart of the software as programmed in the microprocessor of FIG. 1.

The operation of the control will now be described with reference to FIGS. 2–3. Referring to FIG. 2, the microprocessor is programmed, upon a start command 64, to read the temperatures in the motor starter prior to start-up of the motor at 66. The Read_Temps is a subroutine and is called a number of times in the main algorithm of FIG. 2, and will now be described with reference to FIG. 3.

Figure 3:
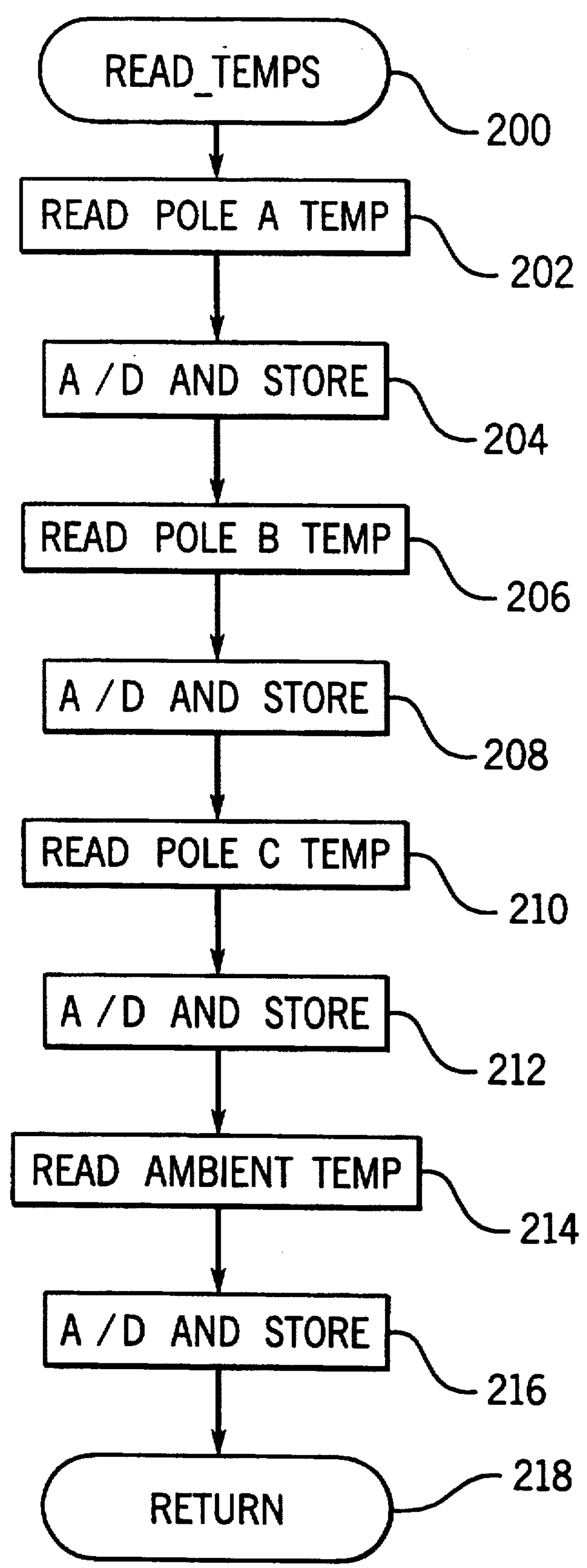
FIG. 3 is a flow chart subroutine as called for in the flow chart of FIG. 2.

As shown in FIG. 3, when the Read_Temps subroutine 200 is called, the microprocessor first reads the temperature of pole A 202 from the first temperature sensor 30, and after converting the analog signal to a digital signal, the result is stored in memory 204. The temperature of pole B 206 is then read and converted from an analog signal to a digital signal, and the result is stored in memory at 208. The third temperature sensor 34 is read to acquire the temperature of pole C 210 and then stored as a digital value 212. The ambient temperature is read at 214 by sensing ambient sensor 36, the signal is converted and stored at 216, and the Read_Temps subroutine returns 218 to the main algorithm of FIG. 2.

Referring back to FIG. 2, after the Read_Temps 200 algorithm is complete at 66, the initial values are saved at 68 and the motor is allowed to start 70. That is, the thermal protection control of the present invention relinquishes control of the motor starter to a main control, which is not a subject of this invention.

Once the motor is running, the temperatures of the power poles and the ambient are read at 72, and stored as initial start-up parameters 74. The processor uses the ambient temperature signals generated by the ambient temperature sensor 36 to model a profile of the external temperature 76. The ambient temperature signal is also used together with the pole temperature signals to model the starter temperature 78 and the motor temperature 80, the results of which are stored in memory 29 in the form of a look-up table. The motor temperature model 80 includes a cool down profile which is acquired after the motor is shut down and the temperatures are read periodically during a normal cool down cycle.

The external ambient model is a function of the geographical region temperatures, the building/zone location and the work day calendar. These are the preferred parameters, but other such factors can also be used in determining the external ambient model. The starter temperature model is a function of the three pole temperature sensors 30, 32, and 34, together with the specifications such as the frame size of the starter, the FLA (full load amperage) rating, FLA duration, starts required per hour and the duration of the starts per hour. Additionally, the lock rotor count (LRC) of the motor and the LRC duration of the motor can be factored into the starter temperature model as well as the trip class and gage of wire used. The motor cool down profile includes much of the same data as the starter, such as FLA and FLA duration, starts per hour, starts per hour duration, LRC and LRC duration, trip class and gage used. It also includes the specific location of the motor, if different from the starter, including geographic region and/or zone or location in the building and the time of day the motor is operational. The motor manufacturing specifications are also used in the cool down model include motor service factor, motor horsepower, and motor frame size.

Referring back to FIG. 2, in a temperature comparison module 82, the temperature of the starter components and the load are used to determine the current temperature of the overall starter system wherein the rise in temperature can be monitored by the system. Once the system temperature has been determined, the processor can next determine if the motor start ampacity is adequate 84 based on the present operating temperatures. The last successful start parameters are then recalled from memory 86. The start parameters include the start time, the start temperature, and the start current. The processor then determines whether it is safe to start the motor 88 when considering the data from the last successful start and the ampacity needed for a current start. If it is determined that the starter can start the motor 88, 90, the start is enabled 92. However, if the processor determines that the ampacity is not adequate for another start, 94, the FLA of the device is increased 96 to compensate for ampacity loss due to an increase in ambient temperature.

The processor then checks to ensure that the FLA ampacity of the starter does not exceed the motor starter's capabilities at 98. If the ampacity required does not exceed the device capabilities 100, the start is enabled 92. If the start will exceed this threshold, the processor delays the start to allow cool down 106 and sets the thermal fault flag 110, and then calculates and displays the time for adequate cool down to allow a next start 112. Temperatures are then read 114, and the process cycles through the modeling steps 76, 78, and 80, and the comparison steps 82, 84, until a start is enabled 92. Once the start is enabled 92, the processor checks to see if the starter has received a run/start command 100, and if not, it continues to cycle through another sequence of the process. If a run/start command is received 100, 102, the motor is allowed to start 70 and the temperatures are read at 72, and the process begins anew.

Accordingly, the invention includes a method of thermally protecting a motor and a motor starter having the steps of periodically monitoring an ambient temperature and a pole temperature of each pole in a motor starter and recording the periodically monitored ambient and pole temperatures. The process includes comparing present ambient and pole temperatures to previously recorded ambient and pole temperatures and preventing a motor start if the temperature comparison reaches a maximum parameter and FLA adjustment is at a motor limit.

The method further includes the steps of tracking motor cool down by periodically monitoring the ambient temperature and the pole temperature during the cool down and modeling external ambient starter temperature and motor temperature. The method includes increasing FLA adjustment if an ampacity limit of the motor starter is not exceeded. If the ampacity limit is exceeded, the motor is prevented from starting, and the method includes displaying a time needed to cool down until a start is permitted.

The invention also includes motor starter control for thermally protecting a motor and a motor starter having an ambient temperature sensor for sensing ambient temperature and creating ambient temperature signals therefrom, and a pole temperature sensor for sensing a pole temperature in the motor starter and creating pole temperature signals therefrom. The control includes a memory for periodically storing ambient and pole temperature signals and a processor for comparing current ambient and pole temperature signals to previous ambient and pole temperature signals stored in memory. The processor is also used for increasing an FLA adjustment to the motor when current ambient and pole temperature conditions cause a previous FLA adjustment to be inadequate to start the motor due to increases in internal resistance. The ambient temperature sensor can include a look up table in memory having therein a range of operating temperatures for a given operating environment. The invention also includes using a thermocouple as a temperature sensor in the motor for real-time temperature sensing of the motor.

The processor also checks any increase in FLA adjustment against a device limit to ensure compliance with motor and starter specifications. The processor also prevents motor start if the FLA adjustment exceeds an ampacity rating and determines a time to a next start. The control includes a display for displaying the time to the next start. The control is capable of tracking cool down time and prevents a motor start until a safe condition exists.

The present invention has been described in terms of the preferred embodiment, and it is recognized that equivalents, alternatives, and modifications, aside from those expressly stated, are possible and within the scope of the appending claims.

What is claimed is:

1. A motor starter thermal compensation control comprising:

an ambient temperature sensor to sense ambient temperature and provide an ambient temperature signal indicative of the ambient temperature about a motor starter;

at least one pole temperature sensor in thermal communication with an electrically conducting bus in the motor starter that produces a pole temperature signal indicative of a temperature of the electrically conducting bus;

a processing unit connected to the ambient temperature sensor and the at least one pole temperature sensor, the processing unit programmed to:

periodically acquire the ambient temperature signal and the pole temperature signal to determine an operating temperature of the motor starter;

monitor change in the operating temperature based on the periodic acquisitions of the ambient and pole temperature signals; and;

adjust an output of the motor starter based on the change in the operating temperature.

2. The control of claim 1 further comprising a memory unit having at least one look-up table to store temperature data.

3. The control of claim 2 wherein the at least one look-up table includes temperature data for at least one of a motor, a motor starter, and an ambient condition.

4. The control of claim 1 wherein the processing unit is further programmed to compare motor starter temperature and load temperature, determine an adequacy of a motor start ampacity, and adjust a motor Full-Load-Amperes (FLA) if the motor start ampacity is not adequate.

5. The control of claim 1 wherein the processing unit is further programmed to adjust a motor Full-Load-Amperes (FLA) to compensate for ampacity lost due to increase in at least one of ambient temperature, motor temperature, and starter temperature.

6. The control of claim 1 wherein the processing unit is further programmed to ensure the motor Full-Load-Amperes (FLA) does not exceed motor starter limits.

7. The control of claim 1 further comprising at least one display device connected to the processing unit to display at least one of an external warning indicative of an excess thermal condition and a time needed to cool down to a next start.

8. The control of claim 1 further comprising:

a motor starter having three power poles, each power pole having a heat sink thereon and a fan in thermal communication with the heat sink;

three pole temperature sensors, each sensor in thermal communication with a power pole of the motor starter and producing first, second, and third pole temperature signals; and wherein the processing unit is further programmed to:

model an external ambient temperature;

model a starter temperature;

model a motor temperature;

perform a temperature comparison;

perform a motor ampacity comparison; and ensure a safe motor start condition based on previous start parameters.

9. The control of claim 1 wherein the processing unit is further programmed to:

track motor cool down by periodically reading the ambient temperature signal and the pole temperature signal and create a motor temperature model;

create an ambient temperature profile model and a pole temperature profile model based on the ambient temperature signals and the pole temperature signals read during motor cool down;

compare the ambient temperature profile model and the pole temperature profile model; and produce a maintenance indication if one or both of the ambient temperature profile model and the pole temperature profile model exceed a safe start condition.

10. A method of thermally protecting a motor and compensating a motor starter comprising the steps of:

periodically monitoring an ambient temperature and a pole temperature of each pole in a motor starter;

recording the periodically monitored ambient and pole temperatures;

comparing present ambient and pole temperatures to previously recorded ambient and pole temperatures;and preventing a motor start if the temperature comparison reaches a maximum safe parameter and an FLA adjustment is at a motor limit.

11. The method of clam 10 further comprising the steps of:

tracking motor cool down by periodically monitoring the ambient temperature and the pole temperature during the motor cool down; and modeling external ambient temperature, starter temperature, and motor temperature based on the tracking.

12. The method of claim 10 further comprising the step of increasing Full-Load-Amperes (FLA) adjustment if an ampacity limit of the motor is not exceeded.

13. The method of claim 10 further comprising the step of displaying a time needed to cool down until a next start is permitted.

14. A motor starter control for thermally protecting a motor and a motor starter comprising:

an ambient temperature sensor for sensing ambient temperature and creating ambient temperature signals;

a pole temperature sensor for sensing a pole temperature in the motor starter and creating pole temperature signals therefrom;

a memory for periodically storing ambient and pole temperature signals;

a processor for comparing current ambient and pole temperature signals to previous ambient and pole temperature signals stored in memory, and for increasing an Full-Load-Amperes (FLA) adjustment to the motor when current ambient and pole temperature conditions cause a previous FLA adjustment to be inadequate to start the motor due to increases in internal resistance.

15. The control of claim 14 wherein the ambient temperature sensor includes a look-up table having therein a range of operating temperatures for a given operating environment.

16. The control of claim 14 wherein the processor checks an increase in FLA adjustment against a device limit to ensure compliance with specifications.

17. The control of claim 14 wherein the processor prevents motor start if the FLA adjustment exceeds an ampacity rating and determines a time to next start, and the control further comprises a display for displaying the time to next start.

18. The control of claim 17 wherein the processor tracks motor cool down and prevents a motor start until a safe condition exists.

* * * * *